No. 851,547. PATENTED APR. 23, 1907.
W. J. MUNCASTER.
MACHINE FOR PRODUCING FINISHED SHAFTING.
APPLICATION FILED APR. 20, 1905.
10 SHEETS—SHEET 5.
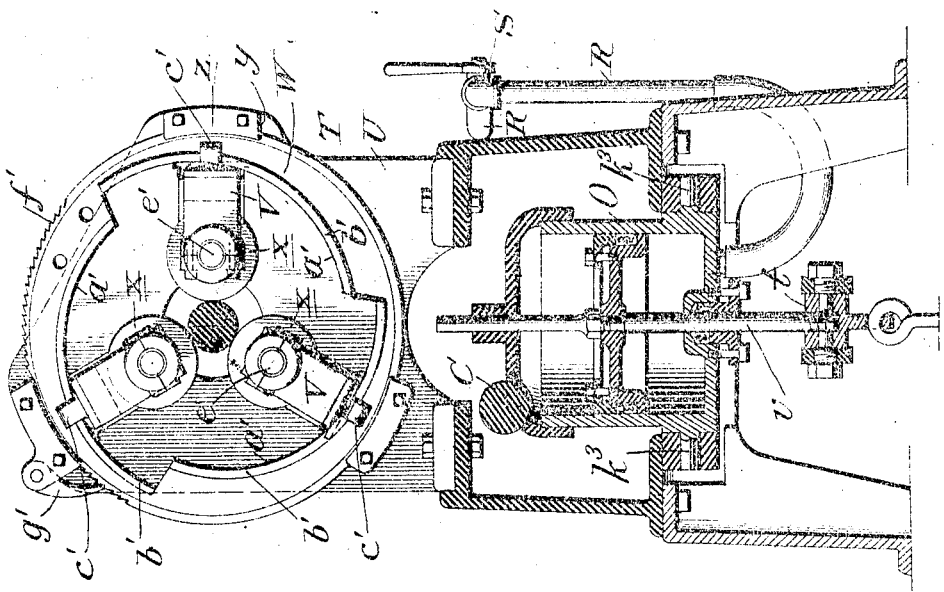
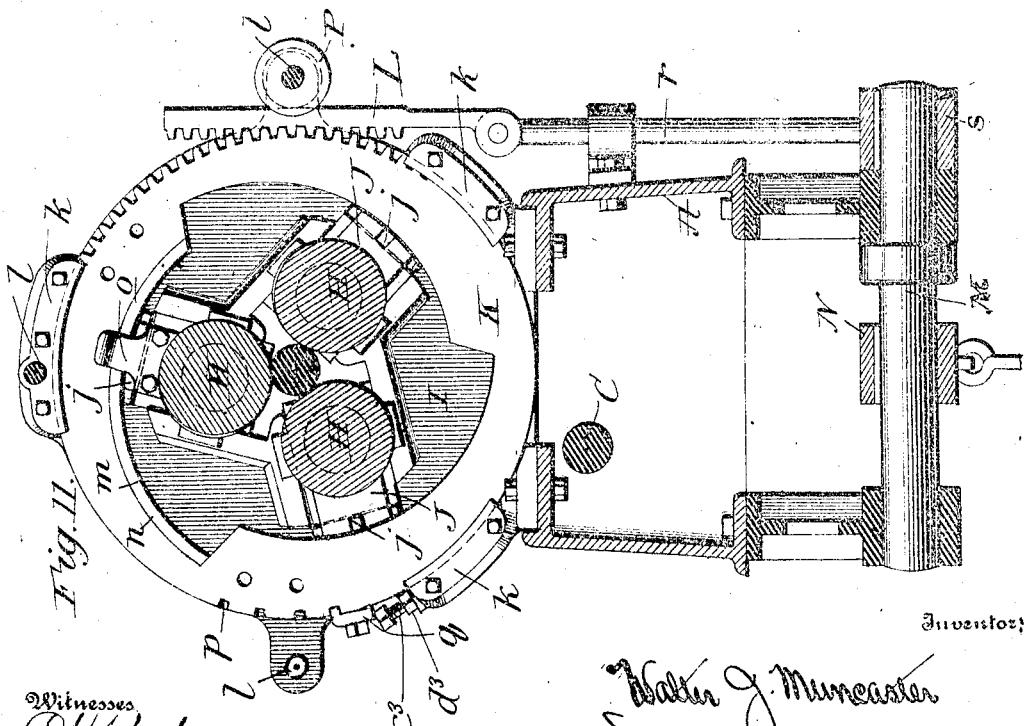
Witnesses
Inventor
Walter J. Muncaster
By
Attorney No. 851,547. PATENTED APR. 23, 1907.
W. J. MUNCASTER.
MACHINE FOR PRODUCING FINISHED SHAFTING.
APPLICATION FILED APR. 20, 1905.
10 SHEETS—SHEET 6.
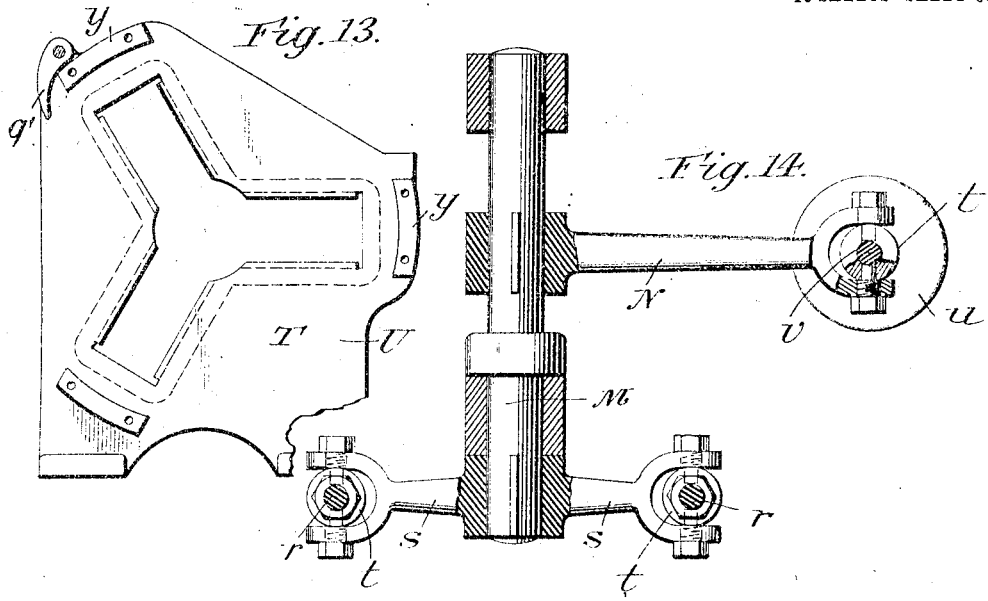
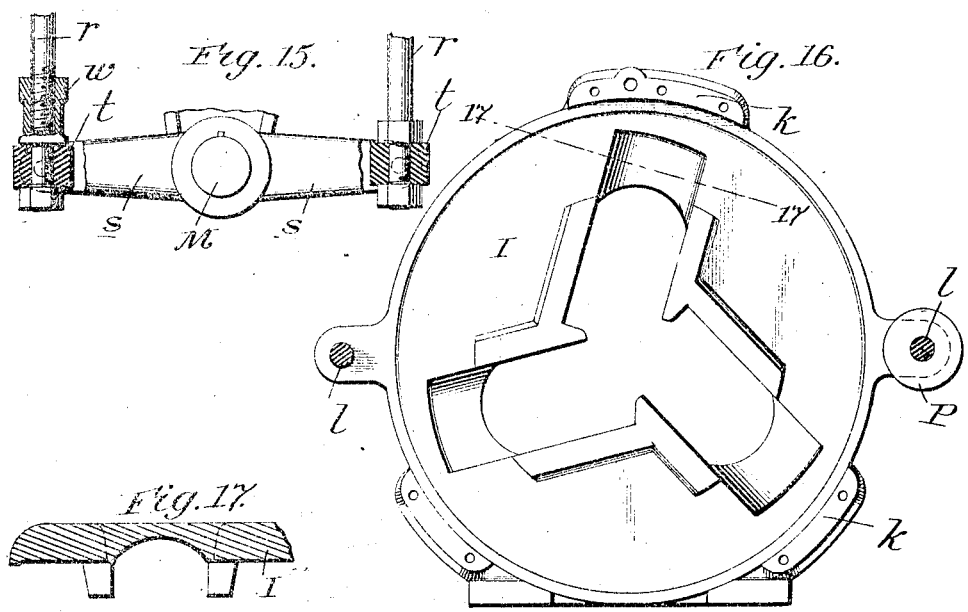
Witnesses
Inventor:
Walter J. Muncaster
By Dodge and Sons.

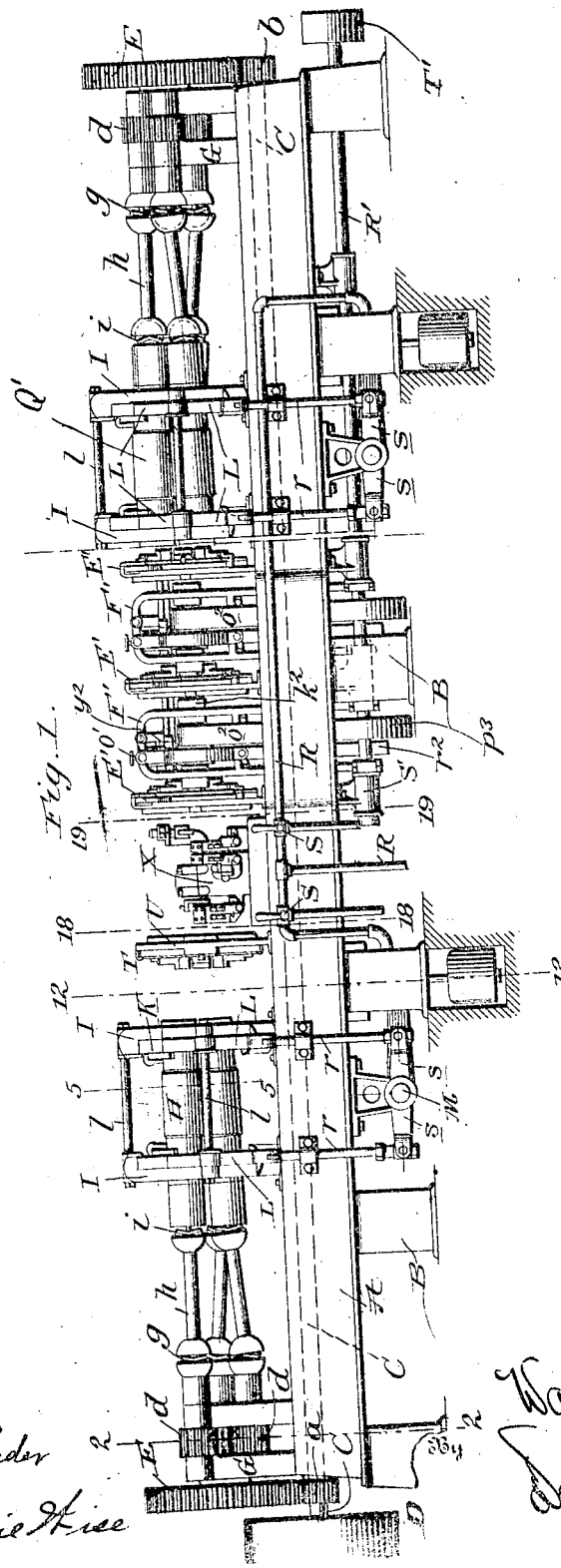

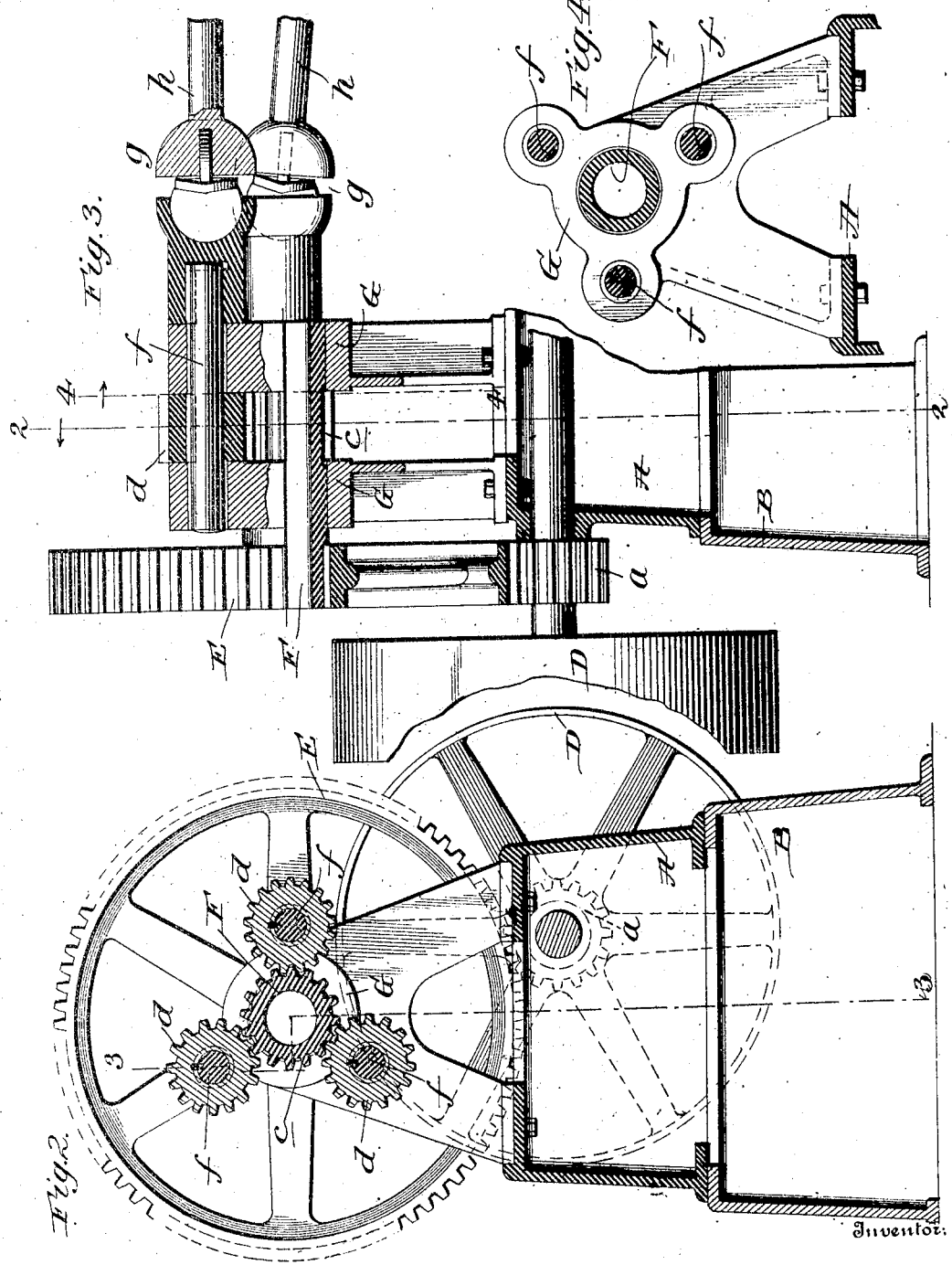

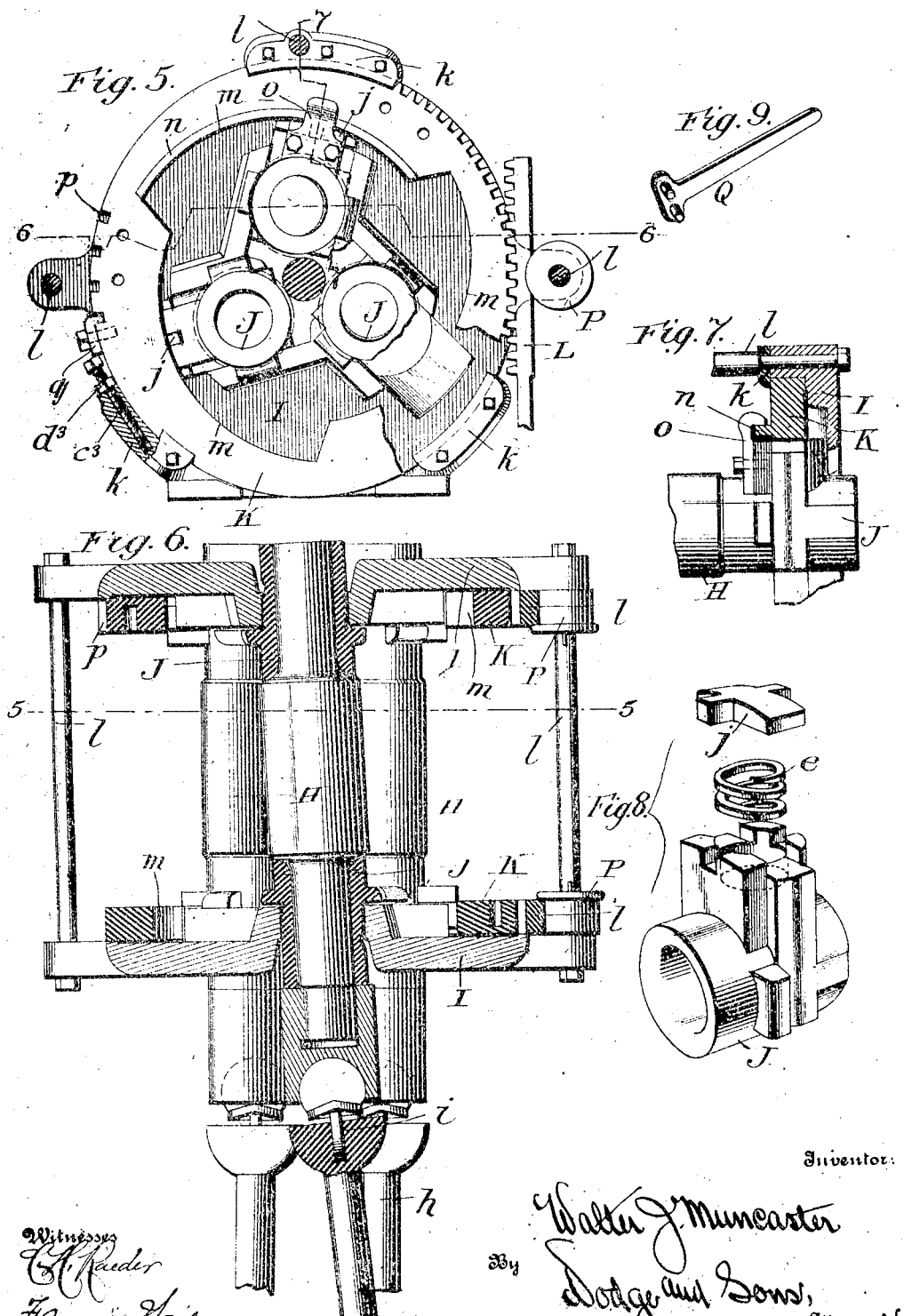

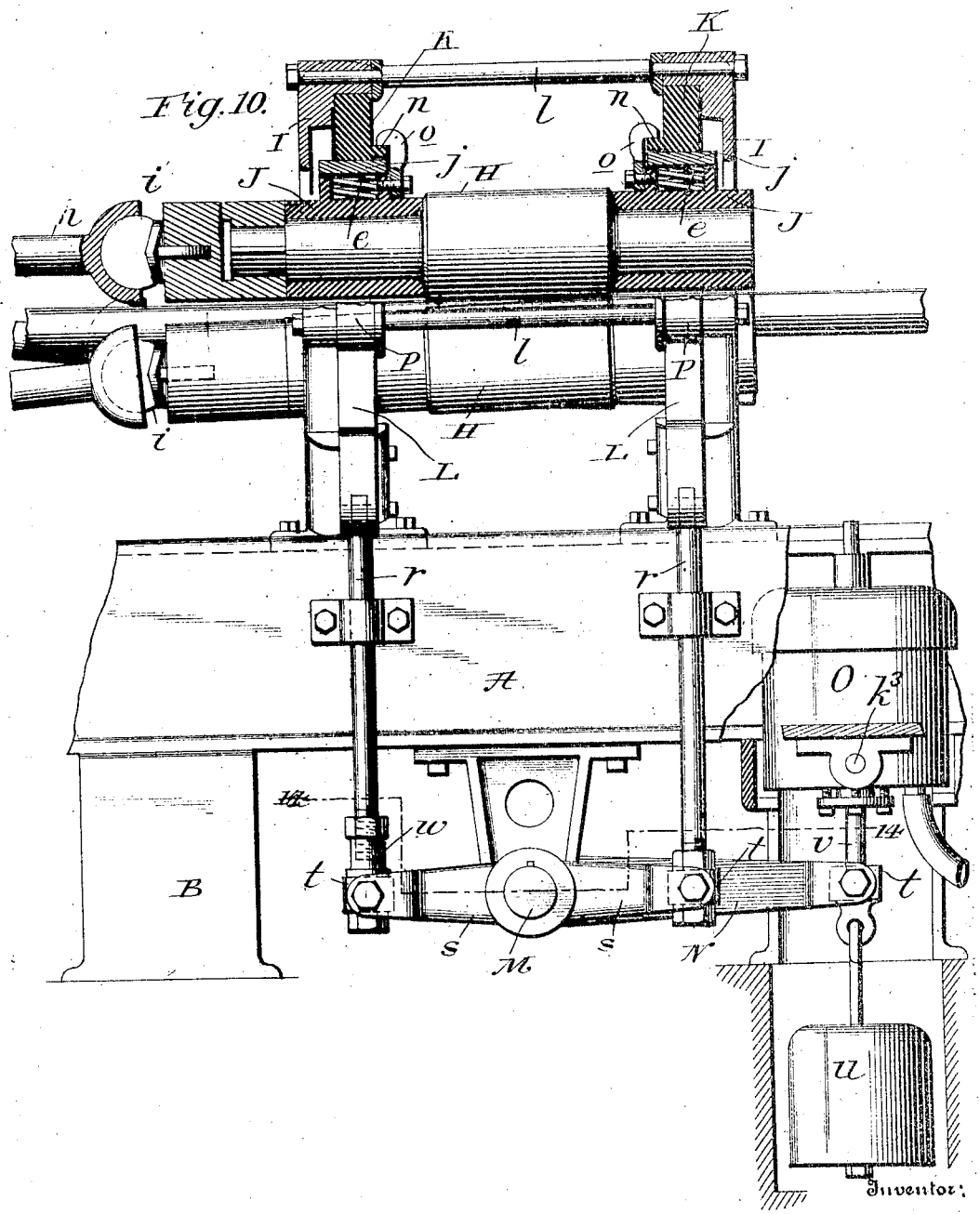

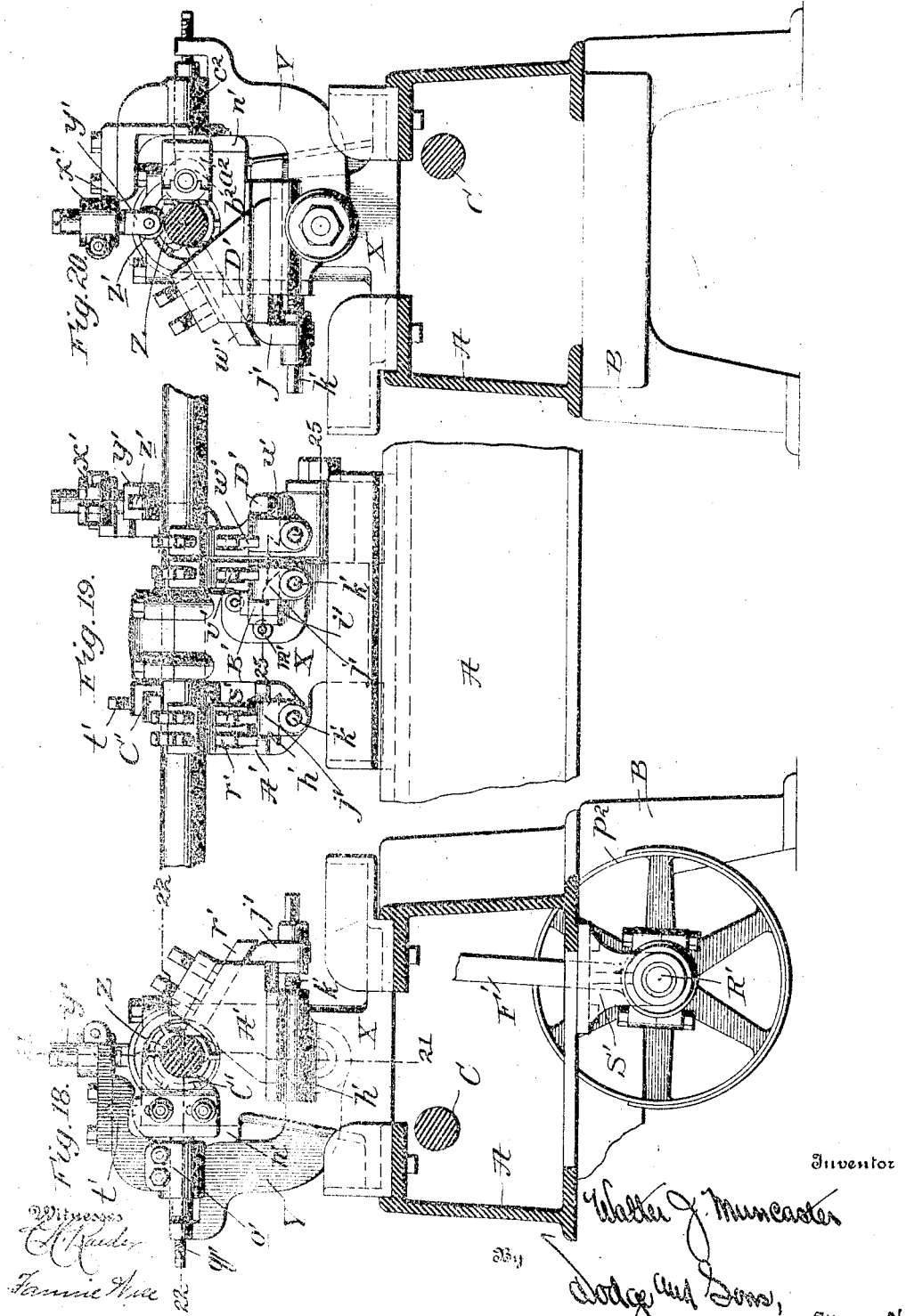

No. 851,547. PATENTED APR. 23, 1907.
W. J. MUNCASTER.
MACHINE FOR PRODUCING FINISHED SHAFTING.
APPLICATION FILED APR. 20, 1906.
10 SHEETS—SHEET 8.
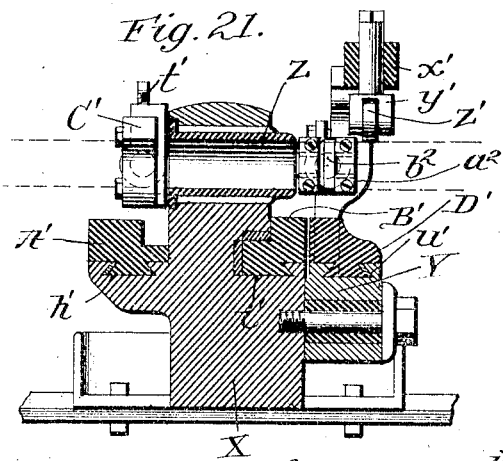
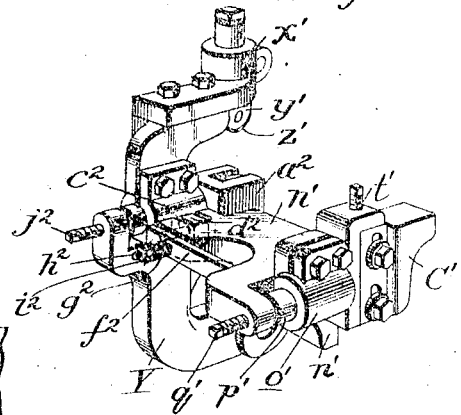
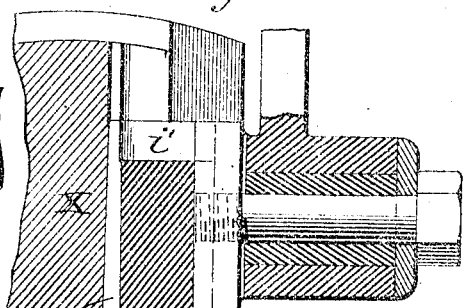
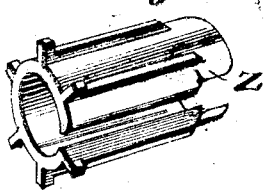
Witnesses
Inventor:
Walter J. Muncaster,
By Dodge and Sons,
Attorneys

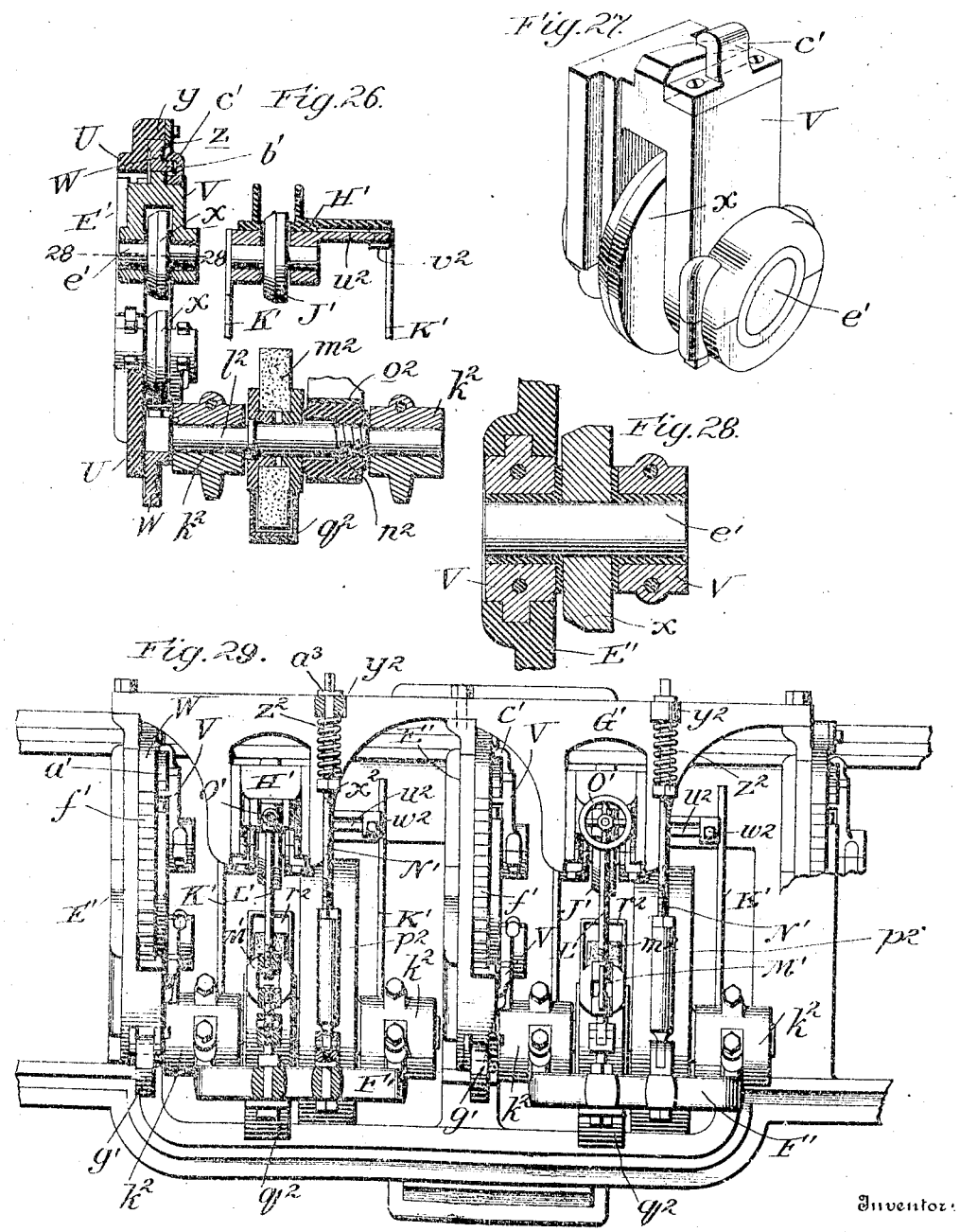

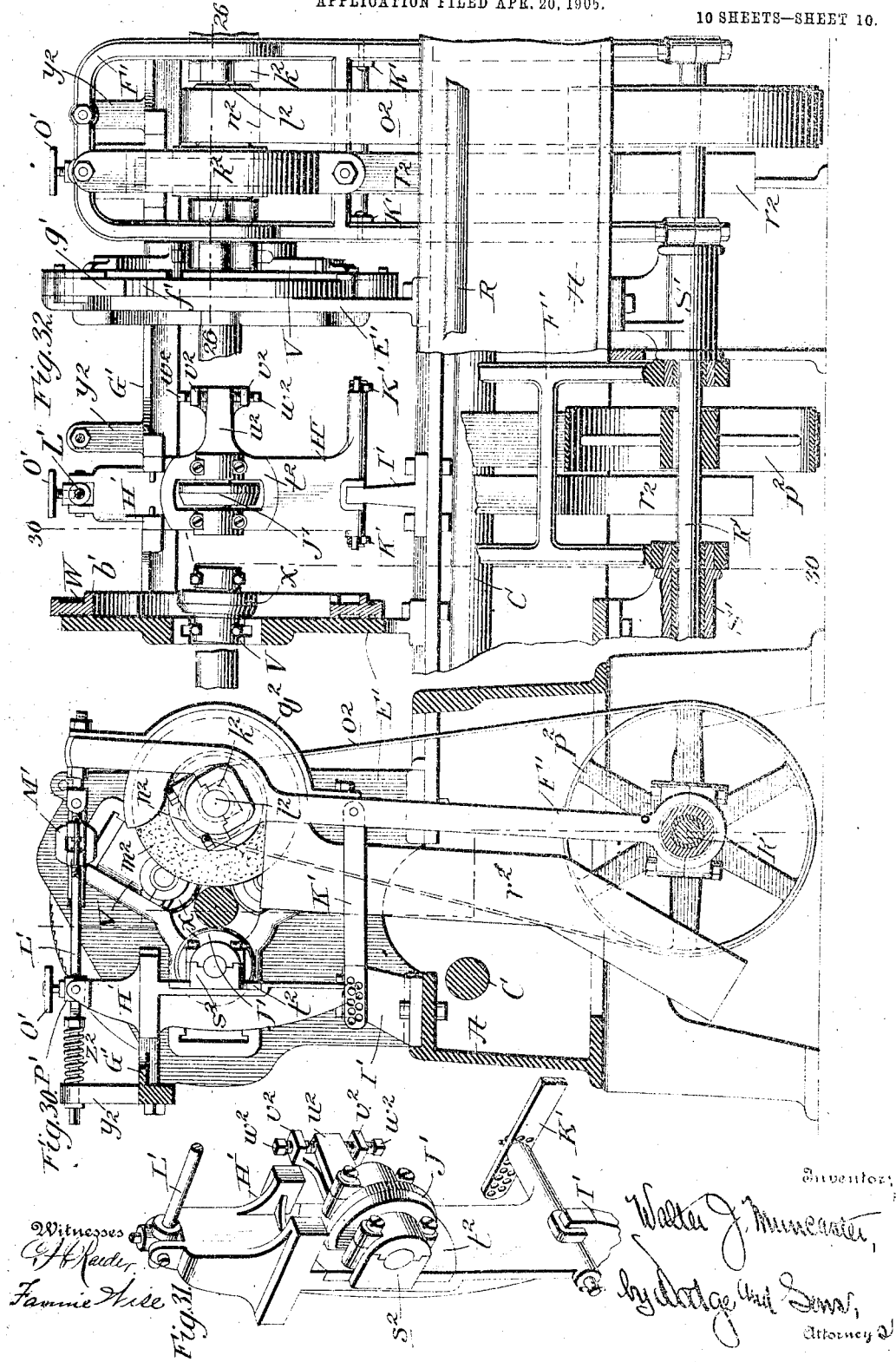

UNITED STATES PATENT OFFICE.

WALTER J. MUNCASTER, OF CUMBERLAND, MARYLAND, ASSIGNOR TO THE CUMBERLAND STEEL COMPANY OF ALLEGANY COUNTY, OF CUMBERLAND, MARYLAND, A CORPORATION OF MARYLAND.

MACHINE FOR PRODUCING FINISHED SHAFTING.

No. 851,547.   Specification of Letters Patent.   Patented April 23, 1907.

Application filed April 20, 1905. Serial No. 256,612.

*To all whom it may concern:*

Be it known that I, WALTER J. MUNCASTER, a citizen of the United States, residing at Cumberland, in the county of Allegany and State of Maryland, have invented certain new and useful Improvements in Machines for Producing Finished Shafting, of which the following is a specification.

This invention has for its object the economical production of highly finished shafting of true cylindrical form and accurate gauge or diameter.

The invention consists in a novel construction, correlation and arrangement of parts, whereby one mechanism is caused to deliver to another, and the rough bars are passed through the machine automatically, emerging finally as highly finished shafting.

By the novel combination of several mechanisms in one structure I attain various important ends. Among these may be noted the lessened cost of machinery, reduced floor space required, saving in power, lessened attendance, and more important than all else, such a support of the work at every stage that the several tools and appliances are enabled to act thereon with an efficiency hitherto unattained, so far as I am aware. From this there results a greater life of the tools, an accurate and true turning of the shafting, a better finish of the same by the grinding wheels, and a final cold rolled polish such as is producible only where the preliminary treatment is of the character now first attained.

The invention as embodied in working mechanism is illustrated in the accompanying drawings, in which:

Figure 1 is a front elevation of the machine complete, except that a section comprising one or more of the grinders and steady rests is removed to bring the whole within the limited space of the sheet, the portion removed being, however, identical with a portion shown; Fig. 2, a vertical cross section on the line 2—2 of Figs. 1 and 3. Fig. 3, a section on the line 3—3 of Fig. 2; Fig. 4, a section on the line 4—4 of Fig. 3; Fig. 5, a section on the line 5—5 of Figs. 1 and 6, with the feed-rollers removed; Fig. 6, a section on the line 6—6 of Fig. 5; Fig. 7, a section on the line 7—7 of Fig. 5; Fig. 8, a perspective view of one of the roller boxes or bearings, its spring and follower; Fig. 9, a perspective view of the spanner or lever used for adjusting the roller boxes or bearings; Fig. 10, an elevation of roll closing or adjusting mechanism, showing a portion of the roll housings and a pair of the roll boxes or bearings in section; Fig. 11, an enlarged section on the line 5—5 of Fig. 1; Fig. 12, an enlarged vertical section on the line 12—12 of Fig. 1; Fig. 13, an elevation of the housing in which are mounted and guided the rolls of the "steady rest"; Fig. 14, a partly sectional top plan view of the lever-and-weight mechanism which serves normally to close the rolls upon the shafting under operation, the section being taken on the line 14—14 of Fig. 10; Fig. 15, a detail view showing the provision for adjusting to proper relative positions the two racks which move opposite ends of the rolls or their boxes toward and from each other; Fig. 16, an elevation of one of the roll housings or supporting frames; Fig. 17, a section through said housing, on the line 17—17 of Fig. 16; Fig. 18, a section on the line 18—18 of Fig. 1, showing in elevation the first cutting tool and the rest which supports the work while said tool operates upon it; Fig. 19, a front elevation of the double tool carriage, with roughing and dressing tools; Fig. 20, a section on the line 19—19 of Fig. 1, looking from the opposite side of the cutting-tool support and showing in elevation the second cutting tool and the work supports; Fig. 21, a vertical section through the tool carriage, on the line 21—21 of Fig. 18; Fig. 22, a horizontal section on the line 22—22 of Fig. 18; Fig. 23, a perspective view of the steady rest or work support used with or as a part of the tool carriage; Fig. 24, a perspective view of the bushing used to guide and support the work between the roughing and final cutting tools; Fig. 25, an enlarged sectional view of portions of the work rest or support, on the line 25—25 of Fig. 19; Fig. 26, a section on the line 26—26 of Fig. 32, through one of the grinding rolls, its gauge roller, and the guide through which the shafting passes to said parts; Fig. 27, a perspective view of one of the guide rollers with its carrying block; Fig. 28, a section on the line 28—28 of Fig. 26, through one of the guide rollers; Fig. 29, a top plan view of a pair of the grinding rolls and attendant parts, a portion of the latter being shown in section; Fig. 30, a transverse vertical section through the machine, on the line 30—30 of Fig. 32, showing one grinding roll and its co-operating parts in side elevation; Fig. 31, a perspective view of one of the grinding roll gauge rollers and its carrier or support; Fig. 32, a front elevation, partly in section of a pair of the grinding rollers, with their gauging rolls, &c.

Prior to my present invention, highly finished shafting has been very costly to produce, for the reason, primarily, that numerous independent operations have been required, involving a very considerable amount of attention and manual work. With a view to reducing the amount of manual work, and to rendering the same as simple and inexpensive as possible, I have heretofore devised various machines and contrivances, among them a self-feeding shafting lathe; tool holders and carriages; work gauges; and grinding and polishing machinery. These, however, were separate and independent machines, requiring that the shafting be delivered to and taken from each separately, and each demanding oversight or attention. The labor item thus occasioned, so far increased the cost of production that the machines referred to have not been, generally speaking, commercially successful, though performing their work fairly well when properly attended.

The present invention aims to dispense with all intermediate handling or manipulation of the shafting, and to render automatic and continuous the work of finishing the shafting from the time its leading end is entered at one end of the machine, until the finished shafting emerges from the other end thereof.

The improved machine comprises feeding rollers by which the shafting is drawn into and advanced through the machine; centering guides or rests which support, center, and guide the shafting; cutting tools, which are arranged to take first a roughing or preliminary cut, and then a final or gauging cut; a bushing which supports and guides the work between said cutters; calipering devices co-acting with the cutters to ensure accurate gauging of the work; grinding and polishing wheels for imparting a smooth surface and high polish to the shafting; and finally, a set of rolls which serves the two-fold purpose of drawing the finished shafting from the machine and imparting a rolled polish thereto in the act of delivering it from the machine.

Mechanism is also provided, whereby the attendant may, from his position in front of the cutting tools, control the separation and approach of the feed rolls, and the polishing or delivery rolls, as required.

It will thus be seen that the present invention resides largely in the adaptation of various mechanisms for conjoint operation, and in their union in one organized structure, all so combined and arranged that the work shall be delivered automatically from one to another mechanism without the need of manual intervention. By this combination and arrangement various feeding mechanisms necessary with independent machines, are dispensed with; the floor space required is greatly reduced; the power necessary to perform a given amount of work is materially lessened; the cost of one complete machine is vastly less than that of the several independent machines; the manual labor and personal attendance required are reduced to a minimum; the work is firmly supported at every point in its travel; and finally, the quality of the work is improved because the different mechanisms act upon the shafting under the same conditions in all respects, whereas in transferring it from one to another machine it is impossible to maintain like conditions throughout.

Having thus stated generally the purpose and character of my invention, I will now describe the preferred embodiment thereof, observing, however, that various of the details may be altered without departing from its spirit.

Referring to the drawings, A indicates a long horizontal bed or frame, supported at suitable intervals on stools or pedestals B.

C indicates a shaft extending lengthwise of the frame or bed A, and supported in suitable boxes or bearings within the same, its ends projecting beyond the frame, as seen in Fig. 1. At one end, the shaft C carries a band-wheel D, and a pinion $a$, and at the other end a pinion $b$, the band-wheel being for the purpose of receiving a driving belt extending thereto from any convenient prime motor. Pinion $a$ meshes with a gear-wheel E, carried by a tubular shaft or hollow mandrel F, journaled in suitable housings G rising from frame or bed A, as shown in Figs. 2 and 3. Between the housings the shaft or mandrel F carries a pinion $c$, which gears with three similar pinions $d$, carried by three shafts $f$, also journaled in the housings, as better indicated in Fig. 4. Each shaft $f$ is connected by a universal joint $g$, with an obliquely arranged bar or member $h$, which bars are in turn connected by universal joints $i$ with rollers H.

The rollers H are designed to draw in the shafting to be operated upon, to rotate it and advance it longitudinally through the machine, hence they are set more or less angling or oblique to the axis of travel of the shafting. Their opposite ends are carried in boxes, adjustable in approximately radial lines, in housings or stationary supports I, I, as will be better understood upon referring to Figs.

5 to 11, inclusive. In said figures, I, I, are the roll housings, suitably bolted or otherwise secured to the main frame A, and each formed with three equally spaced guideways, the axes or medial lines of which are tangential to a small circle concentric with the housings. This provision is made in order that the rollers may bear upon the shafting passing between them at an angle corresponding to the spiral line described by any point in the circumference of the shafting as said shafting rotates and advances longitudinally. It is designed to be the mean between the angular positions demanded by the largest and the smallest shafting handled. The rollers thus positioned may appropriately be described as in spiral order or relation to the axis of the work or shafting operated upon, each roller having its axis oblique or inclined to that of the shafting and to the axes of the companion rollers.

The guideways are in the form of flanged openings in which are mounted or through which extend journal boxes J, formed with substantially rectangular guiding portions to fit the guideways, and with lugs or ears to retain them therein. Two of the guideways of each housing incline downward from their inner ends or from the center of the housing toward the circumference thereof, and the journal boxes J will tend naturally to move outward in their guideways, by gravity. If desired the feed-roll journal-boxes may be pressed inward by springs, to enable them to yield to slight irregularities in the bars or shafting treated. This construction is illustrated in Fig. 8, where the parts are shown separated. The same construction may be applied also to the journal box of the upper roll, which is, however, moved outward positively. All the boxes are forced inward mechanically and at the same rate, by means of a cam ring K, one for each set of boxes; in other words, as there are two housings and two sets of boxes, one set for the journals of each end of the rolls, there are two cam rings K. The rings K are turned truly circular, and each lies flat against the inner face of the housing to which it is applied, being held in such position by flanged retaining and guiding blocks $k$, bolted to the housings, as seen in Fig. 5. The housings are connected and braced by tie-rods $l$, as shown in said figure.

Each ring has three eccentric or cam portions $m$ on its inner face, each of like curvature and relation to the center of the ring, and each designed to bear against the outer end of the guiding block or portion of one or another of the journal boxes J, so that when the ring is turned in proper direction the boxes move simultaneously and equally inward. To move the upper box J outward when the ring is turned in the reverse direction the upper cam $m$ is formed with a projecting flange $n$, and a plate $o$, having a laterally projecting nose to overhang said flange, is bolted to said box, as shown in Figs. 5 and 7.

It is desirable that the closing movement of the rings K be limited, so that after making the proper preliminary adjustment of parts the journal boxes can be moved inward to a definite extent but no farther, the initial adjustment being made to suit the diameter of shafting to be operated upon. For this purpose the periphery of each ring is provided with a series of notches $p$, to receive the lip or bent end of a stop block $q$, which may be bolted to the periphery of the ring at various positions, in each of which the lip or bent end of the block will enter and be held in one of the notches $p$. The notches thus serve the double purpose of accurately locating the stop block, and preventing its shifting from place, the fastening bolt being thereby relieved of most of the strain incident to the stop being brought forcibly into contact with one of the blocks $k$, by which its movement is arrested. Further or finer adjustment is secured by means of a screw-stem $c^3$, provided with jam-nut $d^3$, and screwed into the block $k$ with which stop block $q$ co-acts, see Figs. 5 and 11.

It is desirable that the journal boxes at opposite ends of the rolls be moved simultaneously and equally both inward and outward, and I therefore provide the actuating mechanism illustrated in Figs. 1, 5, 10, 11, 14 and 15. As seen in Figs. 5 and 11, the periphery of ring K is formed or furnished with gear teeth, with which mesh the similar teeth of a rack-bar L, jointed to a vertically reciprocating rod $r$, movable through a suitable guide on the main frame or bed A, as seen in Figs. 1, 10 and 11. Both rings K are thus constructed and equipped, and the two rods $r$ are connected to the outer ends of two oppositely extending arms $s$, $s$, of a lever whose fulcrum is a rock-shaft M, carried in hangers beneath the frame or bed A, as seen in Figs. 1, 10 and 11. Rock-shaft M carries a radial arm N, keyed or otherwise made fast upon it, which with the arms $s$, $s$, constitute a three-armed lever, the power being applied to the outer end of arm N, and the work or load being carried by the outer ends of the arms $s$, $s$. Each arm $s$, as also the arm N, is forked or yoke-shaped at its outer end to receive a pivotal block $t$, carried by pivot screws or bolts passing through the yoke-arms, as seen in Fig. 14. Each block $t$ is bored, as shown in Fig. 15, and as seen in Fig. 10, the block $t$ of arm N has an eye at its lower side, to permit a weight $u$ to be hung therefrom. Rising from block $t$ of arm N is a rod $v$, which constitutes the piston rod of a fluid-pressure motor O, by which the arm or lever N is elevated, the weight $u$ serving to lower it when the cylinder of the motor is vented or exhausted.

The movement of the piston and of arm or lever N and arms s, s, is comparatively slight, and as they move just above and below a horizontal position, the curvature of the paths of blocks t, t, t, is so slight as to be negligible, though the cylinder is preferably mounted on trunnions k³, to prevent cramping or binding of the rods carried by them.

Rising from the blocks t, t, of arms s, s, are the two rods r, r, each having pin-jointed to its upper end one of the rack-bars L, which bars mesh with the teeth of the rings K, as above mentioned.

Owing to the fact that the arms s, s, extend in opposite directions from the rockshaft M, one will rise as the other falls, and as they are at the same side of the common axis of rotation of the rings K, they will of course turn the rings simultaneously in opposite directions. To compensate for this, and cause all the journal boxes or bearings J to move inward or outward simultaneously and equally, the cams of one ring are reversed with reference to those of the other; that is to say, those of one ring widen in the direction of the travel of the hands of a clock, and the others widen in the reverse direction.

In first adjusting the rollers for a given size of shafting, or in changing from one to another size, the stop-block q requires to be properly set, and the rings K must be so turned or set with reference to their racks and the actuating mechanism therefor, that just the proper rotation of the rings and consequent separation and approach of the rolls shall be effected. To permit such adjustment, each rack-bar L is normally held in engagement with its ring K by a flanged roller P, carried by one of the tie-rods l, as seen in Figs. 5, 6 and 11, and capable of being laterally shifted upon said rod to free the racks and permit them to disengage the rings. When thus freed, either ring may be turned forward or backward as required, a wrench or spanner Q (Fig. 9) being provided for the purpose. The wrench or lever Q is preferably provided with two studs or pins to enter sockets formed in a face of the rings, as shown in Fig. 5. The wrench or lever is shown on a reduced scale as compared with Fig. 5.

It is necessary to properly position the racks not only with relation to the rings K, but also to the arms s, s, and lever or arm N, in order to give the proper amount of rotation to each ring, and cause their stop-blocks to reach their arresting abutments at the same instant. To this end I attach the rods r, r to the arms s, s or their blocks t, t in the manner illustrated in Fig. 15, where it will be seen that one of the rods is threaded a considerable distance at its lower end, and screwed into an elongated nut w, which in turn is provided with a stem or shank which is threaded at its lower end, passed through block t, and made fast therein by a nut beneath the block. The other rod r is merely passed through its block t and directly secured thereto by a nut beneath the block, which serves to draw an upper nut or shoulder of the rod firmly against the top of the block. By screwing the rod r into or out of nut w to a greater or less extent, its rack-bar L will be lowered or raised relatively to the arm s, and the relative positions of the two racks can thereby be changed and adjusted as desired. In this way, and by properly setting the rings K and engaging the rackbars therewith, the proper relative movements of the rings and consequently of the roller bearings or boxes can be ensured. This provision for independent adjustment of the racks is quite important, because in practice it is sometimes found necessary to vary the radial distances of the two ends of the rolls from the fixed common axis about which they are grouped or set. It has been observed that slight variation of this relation and the consequent angular relation of the rolls to the shafting will entirely change the character of the action of the rolls upon the shafting. Under one adjustment there will be a rubbing, grinding, or abrading action, while under another, slightly different, there will be a purely rolling action. By properly regulating the obliquity, radial relation of opposite ends to common axis, and pressure of the rolls upon the shafting, the action may be changed from a rubbing, tearing, grinding, or abrading action, to a mere rolling and advancing effect, or to this, accompanied by a highly efficient polishing action.

The same construction and arrangement of rolls, roll bearings, housings, rings, racks, motor and intermediate connections is employed at the delivery end of the machine, hence detailed description thereof will not be necessary.

For the purpose of supplying pressure fluid to the two motors which effect approach of the rollers of the two sets, I provide a pressure-fluid pipe R, which, passing from a boiler, accumulator or other source of supply according to the nature of the fluid employed, branches and extends each way from the main and extends to the motor cylinders, as seen in Fig. 1.

S, S indicate two three-way cocks, one on either side of the main or supply pipe, each designed to control the supply and exhaust of one motor. Set or turned to one position, each valve closes communication between the source of supply and the motor and between the motor and the atmosphere. Turned to its second position it opens communication between the main and the motor cylinder, but closes communication of the cylinder with the atmosphere. In its third position, the valve closes communication between the cylinder and the main, but vents the cylinder or opens it to the atmosphere. In this way the attendant of the machine, standing at or between the valves S, S, can cause arm N of either or of both levers to be elevated, and to raise one and lower the other rack L of either or both pairs, thereby spreading apart or drawing together the rolls of either or both sets, as may be required, the weight serving to lower or reverse the movement of arm N when the cylinder is vented, and the extent of lowering being determinable by the extent or time of such venting. Obviously, a double-acting fluid-pressure motor may be used.

T indicates a "steady rest", located intermediate the rollers H and the cutting tools, and its purpose is to receive the advancing end of the shafting, center it, direct it properly to the preliminary cutting tool, and steady the shafting as it passes the first cutting tool, goes through a bushing interposed between the first and second cutting tools, and passes the second cutting tool.

The cutting tools have been above referred to as taking respectively a roughing cut and a gauging cut, and in a general sense this is correct; but the first cut is itself a gauging cut as well as a roughing cut, to the extent that it brings the shafting to proper size to enter the bushing.

The steady rest is a very important feature in the construction of the present machine. In order to dispense with the services of an attendant or attendants to properly center the shafting as it comes from the rollers, present it to the cutting tool, and cause it to enter the bushing in a manner and form to guard against injury thereto, the shafting must be accurately centered and firmly supported by the steady rest at a point close to the cutting tool, and cut away to the proper extent evenly and concentrically with its axis. The construction of the steady rest is illustrated in Figs. 12, 13, 26, 27 and 28.

Referring to Figs. 12 and 13, U indicates a housing, which is bolted to the bed or main frame of the machine and occupies a vertical position thereon between the receiving rolls and the cutters. The housing is formed with three radially arranged openings, as seen in Fig. 13, the parallel sides or walls of which are grooved or fashioned to receive and guide blocks V, each of which carries a roller $x$, the form of the blocks and rollers being shown in Figs. 26 and 27, which latter figures show a similar rest used at another point in the machine. As shown in Fig. 26, the housing is formed with lugs or projections $y$ on one vertical face, which are of segmental form, their inner faces being concentric with the point of intersection of the guideways in which the blocks V move. A hoop or ring W, Figs. 12 and 26, is placed in contact with the face of the housing, its periphery just touching the inner faces of the lugs $y$, in which position it is retained by plates $z$, bolted or otherwise fastened to the vertical faces of the lugs. The ring W is formed with three cam-like or eccentric faces $a'$, each having a projecting flange or rib $b'$, Figs. 12 and 26, which ribs are received between the outer ends of the blocks V, and hooks $c'$ formed upon or secured to the blocks and overhanging the ribs $b'$, as in Fig. 26, the form of the block and its hook being clearly shown in Fig. 27. It will readily be understood that if the ring be rotated, the cams will force the blocks inward or draw them outward, according to the direction of rotation. Each block V is bifurcated, as seen in Figs. 26 and 27, and between the two arms is mounted a roller $x$, carried by an axle $e'$. The rollers $x$ are of the form shown in Figs. 26 and 27, being beveled on the receiving side or side from which the shafting approaches. The purpose of thus beveling the rollers is to facilitate the entrance of the shafting between the rolls. In order to hold the ring W at any desired adjustment, its periphery is provided with ratchet-teeth $f'$, as shown in Fig. 12, with which engages a pawl or dog $g'$. By lifting the pawl, the ring is free to be turned backward, forward rotation being of course practicable without regard to the pawl, as it will freely lift as the ratchet teeth move forward beneath it. The adjustment is made for shafting of a given diameter, and remains unchanged until shafting of a different diameter is to be handled. The shafting having passed through or between the rolls H, comes to the steady rest, its forward end enters between the rollers $x$, the beveled edges serving to direct it into the opening between them, if not already properly centered. The rolls $x$ are set to bear simultaneously upon the shafting, so that there shall be no appreciable play or vibration, and the rest as a whole is set as close as practicable to the cutting tools.

In Figs. 18 to 24, inclusive, I have illustrated the manner of mounting the cutting tools, and co-acting parts. While I have referred to a first and second cut, I prefer in practice to employ four cutting tools, the first two carried by one tool head, and the third and fourth carried by independent heads, the several tools being set to cut progressively nearer to the axis of the shafting.

Referring to Figs. 18 to 22, inclusive, it will be seen that there is a post or standard X rising from the main frame or bed of the machine, to one side of which is pivoted an arm Y, Figs. 18, 20, 21 and 23. The upper part of the post is formed with a cylindrical opening, the axis of which is horizontal, and the upper wall of which is formed by a removable cap. This opening is designed to receive a split bushing Z, shown in position in Figs. 18, 20, 21 and 22, and detached in Fig. 24. The post is further formed with horizontal guideways $h'$ and $i'$, to receive tool-carrying slides or tool heads $A'$ and $B'$, of the form shown in Figs. 18 and 20. These heads are formed with dovetail ribs on their under faces to fit the guideways, as seen in Figs. 19 and 21, and each has a rearward downwardly extending arm $j'$ in which is swiveled a screw $k'$, the stem of which enters a threaded socket in the post or standard X. The outer end of each screw is made polygonal to receive a wrench or other tool by which to turn it, the screws thus serving to advance or recede the tool heads. The head $B'$ has at one side of its guideway an adjustable wearing strip $l'$, slightly tapering lengthwise, and movable longitudinally by an adjusting screw $m'$, provided with a collar, the periphery of which enters a notch or groove in the side of the strip $l'$, so that by turning the screw to the right or to the left the strip may be advanced or receded to properly fill the space between the guiding rib of the tool head and its guideway. This construction enables me readily to compensate for wear, and to maintain that degree of rigidity of the tool head essential to fine work. A like provision may be made for the head $A'$.

To prevent the work from springing away from the tools of head $A'$, I provide a rest $C'$, of the form seen in Figs. 18, 21, 22 and 23. It will be seen upon referring to said figures that there is an angular casting $n'$, bolted or otherwise secured to the post or standard X, which casting is provided with a tubular barrel $o'$ on one side or end to receive and guide the stem or shank $p'$ of the rest $C'$, the stem $p'$ being free to slide within its barrel $o'$, when relieved of the friction incident to the tightening of the bolts which serve to contract said barrel upon the shank. An adjusting screw $q'$, carried in an arm or bracket of the casting $n'$, serves to move forward the rest $C'$ and accurately to set or gauge its position. It also aids in preventing its backward movement. The bearing block of the rest $C'$, that is to say, the forward block which bears directly upon the shafting and immediately supports the same, is secured to the head of the stem or shank $p'$ by bolts passing through vertical slots in said block, which provision permits vertical adjustment of the rest $C'$ to adapt it to shafting of different diameters. A vertically disposed adjusting screw $t'$, bearing upon the upper end of the block, serves to adjust it and aids in preventing its upward movement when adjusted. Rollers may be substituted for rest $C'$, to bear on the side and top of the shafting, after the manner of rollers $b'$ and $z'$, Fig. 20.

The cutting tools $r'$, $s'$, being clamped in the tool head $A'$, said tool head and the rest $C'$ are adjusted to receive shafting of given diameter, and to take therefrom a roughing cut or cuts sufficient to insure the entrance of the shafting into the bushing Z. This bushing, as shown in Fig. 24, is provided with external longitudinal ribs, which will be formed upon the several bushings for shafting of different diameters, with the exception of the largest bushing used, which may or may not have such ribs. The purpose of this construction is to permit the use of a bushing of sufficiently thin metal to be readily sprung to a limited amount to nicely adjust it to shafting of given diameter, and yet have it fill the space provided for it in the post X. With each successive increase in internal diameter of the bushing the ribs will be reduced in thickness, and in this way a uniform thickness of metal in the body of the bushing may be maintained, together with a proper internal and external diameter of the bushing.

As shown in Figs. 21, 22 and 24, the bushing is provided with radial projections which extend past the walls of its seat or opening at one side of the post X, and prevent its being forced from its proper position by the passage of the shafting through it, and a stud $b^3$, or its equivalent, (Fig. 22), prevents it from turning. The shafting is sustained against springing at the further or delivery end of the bushing Z, by means of roller rests carried by the pivoted arm Y, above referred to, which arm also carries a third guideway, $u'$, for the tool head $D'$ in which is mounted the fourth or finishing cutting tool $w'$, the third tool $v'$ being carried by the tool head $B'$, already described. The construction and mode of adjustment of the tool head $D'$ are the same as in the case of the tool heads $A'$ and $B'$, but the guideway $u'$ is in this case mounted upon or made integral with the rocking or swinging arm Y, hence partakes of its motions and causes its cutting tool $w'$ to do the same. As before pointed out the arm Y passes to the rear of the shafting, thence upward, and finally forward to overhang the shafting. Its forwardly extending part is provided with a split barrel $x'$, in which is mounted and clamped the stem of a vertically adjustable roller-carrying yoke $y'$, the lower bifurcated end of which carries a roller $z'$, to bear upon the upper side of the shafting to prevent the same from lifting after it leaves the bushing and while being acted upon by the cutting tool $w'$. Similarly, a horizontally movable roller-bearing yoke $a^2$, provided at its inner end with a roller $b^2$, has its shank mounted and clamped in a barrel $c^2$ formed upon the rocking arm Y. As shown in Figs. 22 and 23, the arm Y is provided with a lateral lug or projection $d^2$, which extends into an opening in casting $n'$, which opening is wide enough to permit a limited movement of said lug or projection. A pin or rod $e^2$, seated in an opening in a bracket of the casting $n'$ on post X, bears at one end against the lateral projection $d^2$ of arm Y, and at the other end against a bar or lever $f^2$ fulcrumed at one end in the casting $n'$ on post X, and pressed against the pin by a spring $g^2$, encircling a threaded stem $h^2$, and compressed to the desired degree by a nut $i^2$. By this construction and arrangement of parts, the roller $b^2$ is caused to act with a yielding pressure upon the shafting, and to follow up the same in the event of any portion of less diameter than others coming opposite the roller. An adjusting screw $j^2$, passing through a bracket of the arm Y, is arranged in axial alinement with the shank or stem of the roller-bearing yoke $a^2$, for the purpose of accurately adjusting the roller $b^2$ to the shafting. Whenever the roller $b^2$ is subjected to rearward pressure, as, for instance, by reason of any eccentricity, springing, or irregularity of the shafting in contact with the roller $b^2$, the entire swinging arm Y will be thrown backward, but in so doing will bring forward the tool carriage D' and its finishing tool $w'$, thus maintaining a constant relation between the tool and the rollers which support it. In this way the tool and the rests are caused to caliper the shafting and insure its being turned to the precise diameter for which the parts are set or adjusted.

It will be observed, upon referring to Figs. 18 and 20, that the tool heads or carriages A', B' and D' extend well under or beneath the shafting, being inclined thence outward, and that the tools are set at an angle to the horizon, their cutting ends being highest. By this arrangement I am enabled to get the proper shape of the cutting end of the tools, bringing them to a sufficiently acute angle, without reducing their strength to an undesirable degree. In this way I maintain adequate strength of the cutting nose of each tool, and present the tool to the work at the angle most desirable for smooth and efficient cutting. This is quite an important consideration in machines for performing work here contemplated.

From the cutting tools the shafting passes to another steady rest E', which is of precisely the same construction as the steady rest T before described, and the same is true of succeeding steady rests, of which as many will be provided as may be rendered necessary by the number of grinders employed, it being deemed desirable to employ a series of from three to six such grinders of progressively greater fineness, so as to bring the surface of the shafting to a very high degree of finish.

The office of the steady rests E', which rests alternate with the grinders, is to give the greatest practicable degree of steadiness to the shafting, and to maintain it in true axial position with reference to the working parts of the machine throughout.

The grinding mechanisms, which are identical in mechanical construction and mode of operation, are illustrated in Figs. 26, 29, 30, 31 and 32, and their relation to other parts of the machine is shown in Fig. 1, where, as before indicated, only two such mechanisms are illustrated, the machine being broken in two and a section omitted to bring it within the required dimensions of the drawing sheet, without unduly reducing the size of the parts.

Referring to Figs. 30 and 32, it will be seen that there is mounted or swiveled upon the ends of hangers S' carrying a second power shaft R', beneath the main frame A of the machine, a series of swinging frames F', of inverted U-form, each having a suitably divided box at the lower end of each arm or member to permit application to and removal from the reduced ends of the hangers S'. Each frame rises to a point above the axis of work of the machine, that is, above the axis of the shafting passing through the machine for treatment. At a height corresponding to that of the axis of work, each arm of the frame is provided with a divided box or journal-bearing $k^2$, in which boxes are carried the journals of a shaft $l^2$, upon which shaft are secured a grinding wheel $m^2$ and a band-pulley $n^2$, about which latter passes a belt $o^2$, which receives motion from a pulley $p^2$ carried by the power shaft R'. A suitable hood $q^2$ and spout $r^2$ cover the outer and lower side of the grinding-wheel $m^2$, the spout receiving the dust and particles thrown off by the grinding-wheel and directing them downward, away from the shafting and from the face of the attendant moving about the machine. Extending from one to another of the steady-rest housings is a horizontal plate or casting G', having opposite the respective grinding-wheels of the series, openings with parallel walls to receive and guide the upper portions of vertical roll-carrying frames H', of which there is one for each grinding-wheel. The lower end of each frame H' is bifurcated or provided with an inverted U-shaped guide to straddle and slide upon a guiding upright or standard I', secured to and rising from the main frame A of the machine. Each frame H' carries a roller J', the shaft or axle of which is journaled in journal-boxes or bearings $s^2$, projecting from a circular plate $t^2$ swiveled in a seat in the inner face of the frame H', and provided with an arm $u^2$, which extends between two lugs $v^2$ of an arm projecting laterally from the frame H', as seen in Figs. 31 and 32. The lugs or ears $v^2$ are tapped to receive adjusting screws or bolts $w^2$, which, being suitably adjusted, serve to tip the swiveled plate $t^2$ to give a greater or less degree of inclination to the shaft or axle of the roller J', and consequently to throw said roller more or less out of the perpendicular, if desired.

The pressure or bearing rollers of the steady rests are all similarly set with their axes at an angle to that of the shafting. The purpose of this inclination or obliquity is to prevent slipping or rubbing friction and to ensure rolling pressure. The variation in the angle incident to operating upon shafting of larger and smaller diameter within the range of a given machine is so small that it is sufficient to adopt a mean adjustment for some of the rollers at least.

The lower end of each frame H' is connected by links K' with the legs or standards of a frame F', as seen in Figs. 29, 30, 31 and 32, said links being provided with a series of perforations to permit the distance between the frames F' and H' to be adjusted or varied as required to suit shafting of different diameters. Similarly, the upper end of each frame H' is adjustably connected with the upper end of each frame F', but by the special devices illustrated in Figs. 29 and 30. This connection consists of a divided rod L', the two sections of which are connected by a nut or turn-buckle M'. One rod and nut section is threaded ten threads per inch, the other eleven threads per inch, making a minute adjustment possible. One section of the rod is clamped by a screw O' in a pivoted block P' carried by the upper end of the frame H', while the other end is pin-jointed to a yoke carried by the upper end of frame F', as best seen in Figs. 29 and 30. It will be observed that by this arrangement, and after the frames F', H', are placed in proper relation through the adjustment of the links or connections K', L', the grinding-wheel $m^2$ will be held against one side of the shafting because of the bearing of the roller J' against the other side, the distance between said roller and the grinding-wheel being equal to the diameter of the shafting.

For the purpose of making a constant contact of the roller J' with the shafting, and forcing the grinding-wheels away from the axis of the shafting, I provide the mechanism shown in Figs. 29 and 30, comprising a divided draw-rod N', having one section threaded and screwed into the other, the latter section being pin-jointed to the upper end of the swinging frame F', as seen in Fig. 29. The rear portion of the rod N' is also threaded and provided with a nut $x^2$, between which and a standard $y^2$ rising from the main frame A, is placed a spiral spring $z^2$, encircling the rod. This spring, bearing against the nut $x^2$, tends constantly to move frame F' outward or away from the shafting, and by reason of the links K', L', to move frame H' toward the shafting and to hold the roller J' in contact therewith; hence the grinding-wheel $m^2$ can never grind any deeper or reduce the shafting to any smaller diameter than determined by the space between the nearest points of approach of the grinding-wheel and the roller J'. The rear extremity of rod N' passes through the upright $y^2$, and is furnished with a collar $a^3$, which prevents its being drawn forward beyond the point determined by such collar. It may, however, move freely backward if at any time the shafting under treatment force back the roller J', and through the connections described move the frame F' and the rod N'. The compression of spring $z^2$ may be varied by adjusting the nut $x^2$.

The shafting under treatment passes and is successively operated upon by the several grinding-wheels $m^2$, being steadied and guided in passing from one to another by the steady rests E', and finally enters between the delivery rolls Q', which are constructed, mounted and driven in the same manner precisely as the rollers H at the receiving end of the machine, the pinion $b$ giving motion to a gear wheel U', which corresponds to the gear wheel E at the receiving end of the machine.

Power or motion will be imparted to the shaft R', by a belt, from any suitable prime motor, passing about a band-wheel T' on the end of said shaft.

The means for adjusting the rollers Q', including the fluid-pressure motor, will be simply a duplication of the means employed at the receiving end of the machine.

The rollers Q' serve not only to draw the shafting forward and deliver it from the machine, but to give that final, rolled surface or polish which can be imparted in no other way.

It will be seen from the foregoing description that the shafting once entered between the rollers H, is automatically passed through the entire machine without further manipulation, the cutting tools first giving a roughing or preliminary cut to enable the shafting properly to enter the bushing in condition to prevent injury to the latter; that it then passes successively the third and fourth cutting tools, which more accurately gauge and true it; that it is then acted upon by the successive grinding and polishing wheels; and that it is finally given a rolled finish and discharged from the machine. It may be delivered into any suitable receptacle, or passed out over rollers or supports of any kind; or it may be taken away by attendants.

Manifestly, minor details may be varied without departing from the spirit or scope of the invention.

Tubing and cylindrical bodies generally may obviously be finished by the machine above described.

A prominent and essential feature of my construction is the symmetrical arrangement of all the feeding, rolling, cutting, grinding and polishing elements or devices about a fixed common axis, which is also the axis of the shafting operated upon. Without this, not only would frequent change of rolls and their mountings be necessary, but care, skill and time would be required to bring them into proper relative adjustment, with each change. This in turn would necessitate loss of time, and expenditure for skilled labor, which would greatly enhance the cost of production of finished shafting. Finally, it has been found impracticable if not impossible to secure the requisite accuracy of adjustment under such conditions. With the construction and arrangement of parts herein set forth, the same rolls are thoroughly effective for shafting of quite a wide range of diameters, and there is an entire absence of any bending, crushing, indenting, grinding, or disfigurement of the shafting by the feeding rolls, such as is inevitably produced where the shafting or other body is supported at three points in different vertical planes, or by rolls having portions of unequal diameter bearing upon the shafting. By employing rolls of cylindrical or practically cylindrical form, each is caused to have a comparatively long bearing upon the shafting, thereby acquiring a good hold without in the least disfiguring it, but on the contrary rolling down and obliterating those irregularities, which exist in minute form, even after grinding. While theoretically, two cylinders crossing each other at even a slight angle touch only at a point, in practice, and under actual working pressure there is contact for a distance of several inches. It has also been ascertained through long practical experimentation and use that unless the shafting or other body operated upon be supported close to each point at which it is operated upon, true and well finished shafting can not be produced.

Having thus described my invention, what I claim is:

1. In an organized machine for finishing shafting, the combination of a suitable frame; a stand of infeeding rolls arranged in spiral order or relation; a steady rest in close proximity to the infeeding rolls, arranged to receive the shafting directly therefrom; cutting tools located in close proximity to the steady rest and serving to roughly gauge the shafting; a bushing to receive the shafting as it passes from the cutting tools; other cutting tools arranged to act upon and further reduce or gauge the shafting as it emerges from the bushing; grinding and polishing wheels arranged to act upon the shafting after it passes the cutting tools; steady rests to center, guide and steady the shafting in passing the respective grinding wheels; and spirally arranged delivery rolls located in position to receive the shafting as it passes from the grinding and polishing wheels, and serving both to feed the shafting forward and to impart a rolled finish thereto, all the operating parts being grouped about a fixed common axis.

2. In a machine for finishing shafting, the combination of infeeding rolls having their axes symmetrically arranged about and oblique to a common axis; a steady rest opposite the delivery end of said rolls and having steady rolls with their axes arranged in like oblique relation to said common axis; and a cutting tool arranged on the side of the steady rest furthest from the infeeding rolls and in close proximity to the rest, in position to act upon the shafting immediately after it emerges from the rest.

3. In a machine of the character described, the combination of infeeding rolls having their axes obliquely arranged relatively to one another and to the common axis about which they are set; a steady rest to receive the shafting as it is advanced by the rolls; a preliminary cutting tool or tools to act upon and gage the shafting as it emerges from the steady rest; a bushing to receive, center and support the shafting as it passes from the preliminary cutting or gauging tools; and a cutting tool at the delivery end of the bushing to further cut or dress the shafting as it emerges from the bushing, the several devices being symmetrically grouped about a fixed axis common to all.

4. In combination with in-feeding rolls, a steady rest; a post or standard; a preliminary cutting tool mounted in a tool head or carriage carried by said post or standard; a bushing also carried by the post or standard and adapted to receive the shafting as it passes said cutting tool; and a swinging arm pivotally mounted upon the post or standard and provided with a tool carriage and cutting tool, and with a roller opposite said cutting tool to bear upon the shafting as it emerges from the bushing and to maintain the cutting tool in proper relation to the shafting.

5. In a machine for automatically advancing, rotating and finishing shafting, a fixed post or standard; a cutting tool at the receiving side thereof; a cutting tool at the delivery side thereof; and a contractible bushing mounted in said post between the first and second cutting tools, and provided with external ribs, substantially as and for the purpose set forth.

6. In a machine of the character described, the combination of swinging frame F'; grinding roll $m^2$ carried thereby; roll-supporting frame H'; links or connections K', L', extending from frame F' to frame H'; an oscillating plate or head $t^2$, provided with journal-boxes or bearings and with arm $u^2$, and adapted to be oscillated in a vertical plane; screws $v^2$ arranged to bear upon the arm $u^2$; and roller J', having its shaft or axle carried in the journal-bearings of plate $t^2$, substantially as set forth.

7. In a machine for producing polished cylindrical shafting, the combination of infeeding rollers arranged with their axes oblique to one another, and to a common axis about which they are set; cutting tools to remove the scale and roughness from the surface of the bar or rough shafting; grinding wheels arranged to act successively upon the shafting after it is subjected to the cutting tools; and delivery rolls arranged to act upon the shafting after it has been prepared by the grinding-wheels, and to produce a cold-rolled finish thereon.

In testimony whereof I have signed my name to this specification in the presence of two subscribing witnesses.

WALTER J. MUNCASTER.

Witnesses:
  J. F. STARK,
  RICHARD J. BRUCE.